United States Patent [19]

Chen et al.

[11] Patent Number: 4,789,933
[45] Date of Patent: Dec. 6, 1988

[54] FRACTAL MODEL BASED IMAGE PROCESSING

[75] Inventors: Victor C. Chen, Richmond Hts., Ohio; Mike M. Tesic, Los Altos, Calif.

[73] Assignee: Picker International, Inc., Highland Hts., Ohio

[21] Appl. No.: 19,568

[22] Filed: Feb. 27, 1987

[51] Int. Cl.$^4$ .............................................. G06F 15/42
[52] U.S. Cl. ................................. 364/413.13; 382/47; 382/54
[58] Field of Search ........................... 382/27, 47, 54; 358/166, 167; 364/414

[56] References Cited

U.S. PATENT DOCUMENTS

| | | | |
|---|---|---|---|
| 4,386,528 | 6/1983 | Engle | 358/112 X |
| 4,633,503 | 12/1986 | Hinman | 382/47 |
| 4,665,551 | 5/1987 | Sternberg | 382/27 X |
| 4,694,407 | 9/1987 | Ogden | 364/728 X |
| 4,703,353 | 10/1987 | David | 382/47 X |

OTHER PUBLICATIONS

"Analysis and Interpolation of Angiographic Images by Use of Fractals" by T. Lundahl, et al., IEEE, 1985, pp. 355–358.
"Digital Image Enchancement: A Survey" by Wang, et al. Computer Vision, Graphics, and Image Processing, 24, 363–381 (1983).
"Digital Image Processing by Use of Local Statistics" by Jong-Sen Lee, Naval Research Laboratory, pp. 55–61.
"Comparison of Interpolating Methods for Image Resampling" by Parker, et al., IEEE Transactions on Medical Imaging, vol. M1-2, No. 1, Mar. 1983, pp. 31–39.
"Nonstationary Statistical Image Models (and Their Application to Image Data Compression" by Hunt, 1980.
"Fractal Based Description of Natural Scenes" by Alex Pentland, IEEE 1983, pp. 201–209.
"A Note on Using the Fractal Dimension for Segmentation" by Medioni, et al, IEEE 1984, pp. 25–30.
"Computer Rendering of Stochastic Models" by Fournier, et al. Communications of the ACM, Jun. 1982, vol. 25, No. 6, pp. 371–384.

Primary Examiner—Jerry Smith
Assistant Examiner—Steven G. Kibby
Attorney, Agent, or Firm—Fay, Sharpe, Beall Fagan, Minnich & McKee

[57] ABSTRACT

A medical diagnostic apparatus (A) generates medical diagnostic data which is reconstructed by an imager (B) into an electronic image representation. The electronic image representation includes an array of digital pixel values which represent a gray scale intensity of a man-readable image displayed on a video monitor (62). An image improving circuit (C) replaces each pixel value I(i,j) with an improved pixel value I'(i,j) defined as follows:

$$I'(i,j) = G(i,j)[I(i,j) - \bar{I}(i,j)] + \bar{I}(i,j),$$

where G(i,j) is a transfer function uniquely defined for each pixel and $\bar{I}$ is the mean of pixel values of neighboring pixels. The transfer function is based on a self-similarity value which is derived by comparing (i) a variation between the pixel value I(i,j) and pixel values in a first surrounding ring with (ii) a variation between the pixel value I(i,j) and pixel values in a second, larger surrounding ring. A zoom circuit (D) enlarges a selected portion of an improved image. Empty or unfilled pixel values I(inter) are interpolated from a combination of an average of neighboring pixel values I(avg) and a fractal value. The fractal value is a combination of a random number and a weighting factor R determined in accordance with the average self-similarity value of the neighboring filled pixels, i.e.:

$$I(\text{inter}) = I(\text{avg}) + R \cdot (\text{random}\#).$$

20 Claims, 2 Drawing Sheets

FRACTAL MODEL BASED IMAGE PROCESSING

BACKGROUND OF THE INVENTION

The present invention relates to the art of image processing. It finds particular application in conjunction with image enhancement, image smoothing, image zooming and other image improvement techniques for magnetic resonance images and will be described with particular reference thereto. It is to be appreciated, however, that the present invention is also applicable to enhancing, improving and enlarging digital x-ray images, computed tomographic images, nuclear camera images, positron emission scanners, and the like.

Medical diagnostic images have commonly been subject to image degradation from noise, system imperfections, and the like. Various image processing techniques have been utilized to remove the effects of the noise and to highlight some specified features. See for example "Digital Image Enhancement: A Survey" Wang, et al., Computer Vision, Graphics, and Image Processing, Vol. 24, pages 363-381 (1983). In one technique, each pixel was adjusted in accordance with the mean of surrounding pixels and the variation or difference between the pixel value and the local mean (the average of the surrounding pixels). The enhanced pixel value $g'(i,j)$ was a weighted average of the local mean and the variation:

$$g'(i,j) = \bar{g}(i,j) + k[g(i,j) - \bar{g}(i,j)] \quad (1),$$

where $\bar{g}(i,j)$ was the local mean, $g(i,j) - \bar{g}(i,j)$ was the variation, and $k$ was a constant that weighted the relative contributions therebetween. It is to be appreciated that when $k$ was set larger than 1, the variation, hence the fine details were magnified. As $k$ was set smaller, the image was smoothed or blurred as if acted upon by a low-pass filter. At the extreme at which $k$ was set equal to zero, each pixel value was replaced by the local mean of the neighboring pixel values.

One of the drawbacks in this technique resided in selecting an appropriate value for the weighting factor $k$. The smaller $k$ was set, the more the image was blurred and the more difficult it became to extract accurate diagnostic information. As $k$ was set larger, edges and fine details, including noise, became enhanced. Frequently, in a medical image, the selected weighting factor $k$ was too large for some regions and too small for other regions.

"Digital Image Enhancement and Noise Filtering by Use of Local Statistics" by J. S. Lee, IEEE Transactions on Pattern Analysis and Machine Intelligence, Vol. 2, pages 165-168 (1980), recognized that different weighting factor $k$ could be selected for each pixel to be enhanced. Specifically, Lee suggested setting the $k$ for each pixel equal to the square root of the ratio of a preselected desirable local variance to the actual local variance of the selected pixel. Although Lee's weighting factor achieved better resultant images than the constant weighting factor, there was still room for improvement.

Another problem with medical diagnostic images resided in the blurring of enlarged or zoomed images. Typically, the diagnostic image included a fixed number of pixel values, e.g. a 256×256 pixel value matrix or array. When the image or a pattern thereof was enlarged each pixel could be displayed as a larger rectangle or additional intervening pixel values must be generated. For example, when a 256×256 array was enlarged to a 512×512 array, no data existed for alternate lines and for alternate columns of the 512×512 matrix. Commonly, the missing matrix values were interpolated by linear averaging the nearest neighboring pixel values. However, averaging adjacent pixels tended to blur the resultant enlarged image.

Another interpolation technique for zooming is described in "Analysis and Interpretation of Angiographic Images by Use of Fractals", T. Lundahl, et al., IEEE Computer in Cardiology, page 355-358 (1985). In Lundahl's technique, a global or image wide fractal model was utilized to derive the missing, intervening pixel values of an enlarged digital angiographic image. Lundahl, et al. first calculated a global fractal dimension for the entire image which described the average roughness or smoothness of the intensity surface of the entire image. The interpolated pixel values were based on the average of neighboring pixel values plus or minus a function of global fractal dimension. The plus or minus sign was chosen at random. One of the drawbacks in their technique is that the interpolated value was always different from the neighboring average by a function of the global fractal dimension when in fact, in the real world there is a certain chance for the interpolated value to be equal to the average of the neighboring values. While the addition or subtraction of a function of the global fractal dimension value made the image more realistic and easier to view, the interpolated pixel values were inaccurate and could cause an erroneous diagnosis. Particularly in low pixel value regions of an image with a large global fractal dimension, fictious image details could be generated during enlargement. This was caused by their use of the global fractal dimension in doing local interpolation. This is the other drawback of their technique.

The present invention is based on a new image fractal model, which describes images much more like real-world images. By the use of the fractal model, the processed medical image looks much more natural than the one by the use of traditional techniques.

The fractal model is based on the theory of fractal brownian motions developed by B. Mandelbrot. This theory provided a useful model for description of real-world surface. See 'Fractal: Form, Chance, and Dimension' and 'The Fractal Geometry of Nature', B. Mandrelbrot, W. H. Freeman and Company (1977) and (1982) respectively.

SUMMARY OF THE INVENTION

In accordance with one aspect of the present invention, a method of diagnostic imaging is provided. An electronic image representation which includes an array of pixel values is generated. A self-similarity value is generated corresponding to each pixel value. Each self-similarity value varies in accordance with the variations between the corresponding pixel value and the surrounding contiguous pixel values. Each pixel value of the image representation is replaced by a weighted combination of the pixel value to be replaced and the average of the surrounding pixel values. The combination is weighted in accordance with the corresponding self-similarlity value such that for enhancement the more similar the pixel value is to its surrounding contiguous pixel values, the more heavily the pixel value is weighted, i.e. the less enhancement is taken, and the less similar the pixel value is to its surrounding, contiguous pixel values, the more heavily the variation value is weighted. However, for smoothing, the more similar the pixel value is to its surrounding contiguous pixel values, the more heavily the average of the surrounding pixel values is weighted and the less similar the pixel value is to its surrounding pixel values, the more heavily the pixel value is weighted.

More specific to the preferred embodiment, the self-similarity value is selected in accordance with a ratio of (i) a first averaging difference between the given pixel value and the pixel values in a first surrounding ring and (ii) a second averaging difference between the given pixel value and the pixel values in a second surrounding ring. In this manner, the self-similarity factor varies in accordance with the ratio of the averaging difference between the given pixel value and two concentric rings therearound.

In accordance with another aspect of the present invention, a method of diagnostic imaging is provided. An electronic image representation is defined by an array of pixel values, a fraction of the pixel values are generated from medical diagnostic data and the remaining pixel values are determined by interpolating the diagnostic data based pixel values. For each of a plurality of regions of the image, a roughness factor which varies with the degree of variation among pixel values within the region is determined. The roughness is largest in areas with large variations and smallest in homogeneous regions. Each interpolated pixel value is set equal to an average of surrounding diagnostic data based pixel values plus the product of the roughness factor and a Gaussian random number. In this manner, the interpolated pixel values are substantially equal to the average of neighboring diagnostic data based pixel values in substantially homogeneous regions. In regions with widely varying pixel values, the interpolated pixel values may vary more significantly from the neighboring value average.

In accordance with another aspect of the present invention, an apparatus is provided for processing diagnostic images. An image data memory means stores a plurality of pixel values based on diagnostic data. A self-similarity value calculating means calculates a self-similarity value corresponding to each pixel value stored in the memory means. The self-similarity values are determined in accordance with a ratio of the differences between the corresponding pixel value and the pixel values in at least two surrounding rings of pixel values. A mean value determining means determines for each pixel value a corresponding mean value based on the average of neighboring pixel values. A filtering means combines each pixel value with the corresponding mean value with the relative weight of the pixel value and the corresponding mean value being weighted in accordance with the corresponding self-similarity value.

In accordance with another aspect of the present invention, an apparatus for processing diagnostic images is provided. A diagnostic imaging means generates a plurality of diagnostic data based pixel values which are stored at a predetermined fraction of the pixel of an image memory. The unfilled image memory pixels are denoted as interpolated pixels. An averaging means averages diagnostic data based pixel values neighboring each interpolated pixel. A roughness factor determining means determines a roughness factor in the neighborhood of each interpolated pixel, which roughness factor varies in accordance with the variation of diagnostic data based pixel values in the region. A random number generator generates Gaussian random numbers. A combining means combines the random number generated by the random number generator with the roughness factor to produce a fractal value and combines the fractal value with the average from the averaging means to generate an interpolated pixel value. An interpolating means returns each interpolated pixel value to the image memory for storage at the corresponding interpolated pixel.

One advantage of the present invention is that it generates medical diagnostic images of improved viewability.

Another advantage of the present invention is that it provides an improved pixel selective filtering function for automatically smoothing noise an enhancing resultant images.

Another advantage of the present invention is that it enlarges images while retaining the same apparent sharpness to the viewer's eye.

Still further advantages of the present invention will become apparent to those of ordinary skill in the art upon reading and understanding the following detailed description of the preferred embodiment.

BRIEF DESCRIPTION OF THE DRAWINGS

The invention may take form in various steps and arrangements of steps and in various components and arrangements of components. The drawings are for purposes of illustrating a preferred embodiment and are not to be construed as limiting the invention.

DETAILED DESCRIPTION OF THE PREFERRED EMBODIMENT

Figure 1:
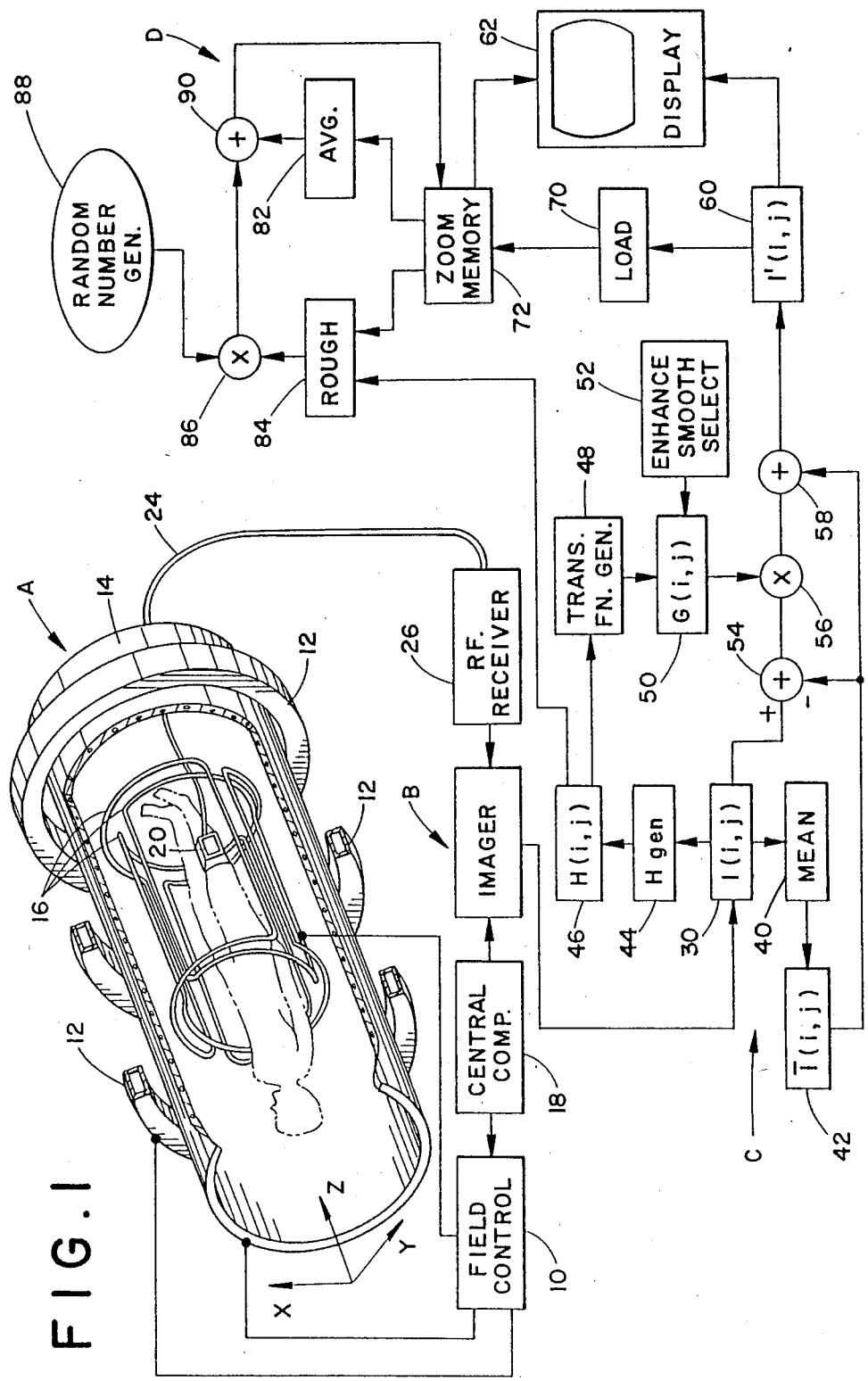
FIG. 1 is a diagrammatic illustration of a medical diagnostic imaging system in accordance with the present invention.

With reference to FIG. 1, a medical diagnostic apparatus A generates medical diagnostic data which is reconstructed by an imager B into an electronic image representation. An image filter and enhancement circuit C operates on the electronic image representation to improve the image quality and viewability thereof. A zoom circuit D selectively enlarges the resultant image representation or regions thereof.

Although a magnetic resonance imager is illustrated, the medical diagnostic apparatus A may be a computerized tomographic scanner, a digital x-ray apparatus, a positron emission scanner, a nuclear camera, or other diagnostic apparatus which generates data that is able to be reconstructed into an image representative of a region of an examined patient or subject. The illustrated magnetic resonance imager includes a field control means 10 which controls a main, homogeneous polarizing magnetic field through an image region generated by electromagnets 12. The field control means 10 also controls gradient magnetic fields created across the image region by gradient field coils 14 to provide spatial encoding, phase encoding, and slice select gradients. The field control means 10 further generates radio frequency electromagnetic excitation signals which are applied to excitation coils 16 to excite resonance of dipoles in the image region. A central computer 18 controls the relative timing and strengths of the gradient and radio frequency electromagnetic fields.

A receiving coil 20 is surface mounted on the patient 5 to receive magnetic resonance signals generated by resonating dipoles in the image region. A flexible cable 24 conveys the magnetic resonance signals to radio frequency receiver 26. The radio frequency receiver 26 supplies magnetic resonance medical diagnostic data to the imager B.

The imager B under control of the central computer 18 reconstructs the medical diagnostic data into an electronic image representation. More specifically, the imager B reconstructs digital pixel values, each pixel value corresponding to a preselected subregion or pixel of the image region. The algorithm implemented by the imager is selected in accordance with the medical diagnostic apparatus selected. Conventionally, the pixels or subregions are arranged in a rectangular array (i,j) with the corresponding pixel values I(i,j) being arranged in a like rectangular array. The electronic image representation, particularly the rectangular array of pixel values I(i,j), is stored in a first image memory 30.

Figure 2:
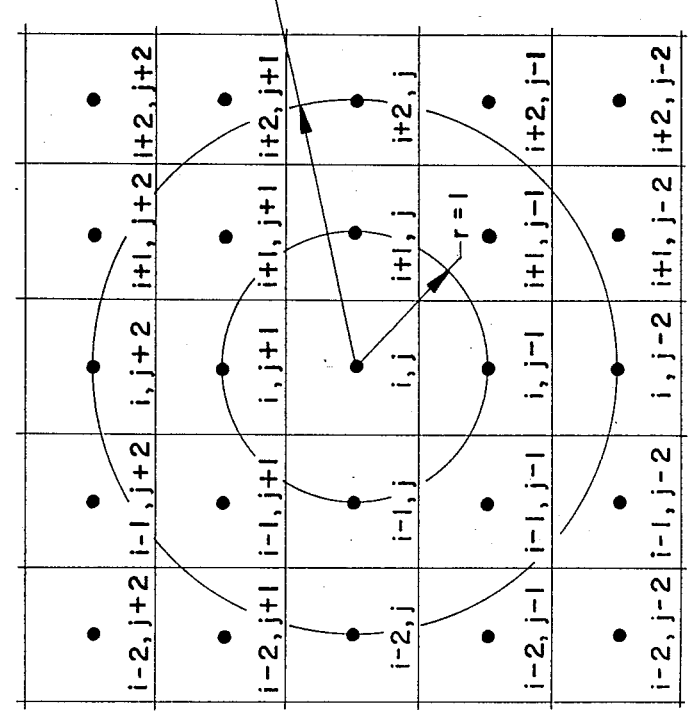
FIG. 2 diagrammatically illustrates calculation of a self-similarity factor in a 5×5 pixel region about a pixel (i,j)

The image filtering and enhancing circuit C includes a pixel value averaging means 40 which generates a matrix of averaged or mean pixel values for storage in a mean value memory 42. Each mean pixel value $\bar{I}(i,j)$ is set equal to the average of the pixel values in the neighborhood of a corresponding pixel value of the first image memory 30. Preferably, the pixel mean value means 40 determines each pixel mean value as follows:

$$\bar{I}(i,j) = \frac{1}{(2l+1)^2} \sum_{x=0}^{l} \sum_{y=0}^{l} I(i \pm x, j \pm y), \quad (2)$$

where l is indicative of the size of the neighborhood over which the mean value is averaged. For example, as illustrated in FIG. 2, for l=2, a 5×5 neighborhood is defined in which the mean value represents the average of the 25 pixel values in the neighborhood. Optionally, other averaging algorithms may be utilized. For example, a 3×3 neighborhood may be selected. As yet another option, the average may include the average of the surrounding pixel values in the neighborhood but not the pixel value itself, e.g. the 24 surrounding pixel values of a 5×5 neighborhood. The surrounding pixel values may be weighted inversely with radial distance, or the like.

A self-similarity parameter generator 44 derives a self-similarity value H(i,j) corresponding to each pixel value for storage in a self-similarity value memory 46. In Euclidean geometry, th Euclidean dimension, E, is an integer. For example, E=2 for lines and E=3 for surfaces. In topological geometry, the topological dimension, Dt, is also an integer, but Dt=1 for lines and Dt=2 for surfaces. In fractal geometry, the fractal dimension, D, need not be an integer, although it is commonly a real number. The fractal dimension is equal to or greater than the topological dimension and less than corresponding Euclidian dimension. For example, $1 \leq D \leq 2$ for lines and $2 \leq D < 3$ for surfaces.

The fractal dimension may be viewed as a measurement of the degree of irregularity or roughness. As the fractal dimension becomes larger and approaches the Euclidean dimension, the surface becomes more rough; as the fractal dimension becomes smaller and approaches the topological dimension, the surface becomes smoother.

The self-similarity parameter H is equal to the difference in the Euclidean and fractal dimensions, i.e.

$$H = E - D \quad (3).$$

Thus, the smoothest surface is defined when H=1 and the surfaces become rougher as H becomes less than 1.

In the present invention, the self-similarity parameter for each pixel, H(i,j) is determined by monitoring the neighborhood or environment around the corresponding pixel. The greater the variation between a given pixel value and the surrounding pixel values, the smaller the self-similarity parameter. The more uniform the neighborhood, the closer the self-similarity parameter approaches one.

With reference to FIG. 2, the self-similarity parameter is derived using a convolution type function. Specifically, for a given pixel, (i,j), the averaging difference between the given pixel value I(i,j) and pixel values in a first surrounding ring is compared with the averaging difference between the given pixel value and pixel values in a second surrounding ring. For rings of radius m and n, the definition of a scaler Brownian function provides:

$$(n/m)^H = \frac{k(n;i,j)}{k(m;i,j)}, \quad (4)$$

$$k(n; i,j) = \left( \sum_{(n-1)<r\leq n} |I(i,j) - I(k,l)| \right)/N, \quad (5)$$

where
N=Number of pixels whose centers fall in the ring between n and n−1.
and $$r^2 = (i-k)^2 + (j-l)^2 \quad (6).$$

An expression of H can be obtained by taking the base-10 logarithm of both sides of Equation (4):

$$H \log(n/m) = \log\left(\frac{k(n;i,j)}{k(m;i,j)}\right) \quad (7)$$

or $$H(i,j) = \frac{\log k(n;i,j) - \log k(m;i,j)}{\log(n) - \log(m)} \quad (8)$$

Thus, a self-similarity parameter or value H is determined in accordance with a ratio of two differences. The two differences are (1) the difference between the logarithm of the function k at the nth ring and the logarithm of the function k at the mth ring and (2) the difference between the logarithm of n and the logarithm of m.

In the embodiment illustrated in FIG. 2, n=2 and m=1. For pixel (i,j), illustrated in FIG. 2, k(2;i,j) is the average of the differences between the pixel value I(i,j) and the pixel values corresponding to each of pixels (i,j+2), (i−1,j+1), (i−2,j), (i−1,j−1), (i,j−2), (i+1,j−1), (i+2,j), and (i+1,j+1). Similarly, with the radius of the inner ring set equal to one, k(1;i,j) includes the average of the differences between the intensity at pixel (i,j) and the intensities corresponding to each of pixels (i,j+1), (i−1,j), (i,j−1), and (i+1,j). That is, k(1;i,j) is the average of the differences between the pixel intensity or pixel value of pixel (i,j) and each of the pixels whose centers line on or within the radius of one interpixel spacing, r=1, and k(2;i,j) includes the difference between the value of pixel (i,j) and the pixel value corresponding to each pixel whose center lies outside of the r=1 ring and on or inside the r=2 ring.

It is to be appreciated that although the two rings are illustrated in the preferred embodiment as being continuous, a gap may be defined between the two rings. For example, the first ring might include those pixels whose centers fall between $\frac{3}{4}$ and $1\frac{1}{4}$ of the interpixel spacing and the second ring might include those pixels whose centers fall in the ring between $1\frac{3}{4}$ and $2\frac{1}{4}$ times the interpixel spacing. As another example, the pixel value of each pixel whose rectangular area falls even partially within a given ring may be determined and the difference may be weighted in accordance with the percentage of the pixel area which falls within the given ring. Optionally, additional rings may be defined concentrically around the first and second rings. Preferably, the effect of additional outer rings is reduced inversely with the larger radius of the outer rings. In this manner, the self-similarity value for each pixel is derived from a convolution type function.

Figure 3:
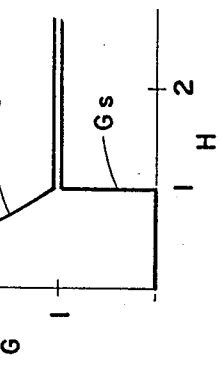
FIG. 3 is a diagrammatic illustration of a preferred transfer function G(i,j); and, FIG. 4 is a diagrammatic illustration of an interpolation technique around the pixels of the zoom memory.

With continuing reference to FIG. 1 and further reference to FIG. 3, a transfer function means 48 derives a transfer function for each pixel G(i,j) which may be stored in a transfer function memory means 50. In the preferred embodiment, the transfer function may either (i) enhance the image, i.e. accentuate edge effects or (ii) smooth the image, i.e. reduce noise effects for a more uniform image. For enhancement, an enhancement transfer function $G_e(i,j)$ is utilized. In the preferred embodiment, the enhancement transfer function is selected in accordance with:

$$G_e(i,j) = \begin{cases} 2 & \text{for } H(i,j) < 0.5 \\ 1/H(i,j) & \text{for } 0.5 \leq h(i,j) \leq 1.0 \\ 1 & \text{for } H(i,j) > 1.0 \end{cases} \quad (9)$$

For smoothing, a smoothing transfer function $G_s(i,j)$ is selected for each pixel in accordance with:

$$G_s(i,j) = \begin{cases} 1 & \text{for } H(i,j) > 1.0 \\ 0 & \text{for } H(i,j) \leq 1.0 \end{cases} \quad (10)$$

An operator control 52 enables the operator to select between the described enhancement and smoothing transfer functions or other preselected transfer functions.

It is to be appreciated that the image memory 30, the mean value memory 42, the self-similarity value memory 46, and the transfer function memory 50 are for purposes of illustration. The values described as stored in these memories may be stored as described, calculated in real time, or a combination of both.

In the preferred embodiment, the image smoothing-/enhancement circuit C derives an improved image value for each pixel, I'(i,j), which is related to a combination of the pixel value, I(i,j) and the corresponding mean pixel neighborhood value $\bar{I}(i,j)$ weighted in accordance with the transfer function G(i,j), specifically:

$$I'(i,j) = G(i,j)[I(i,j) - \bar{I}(i,j)] + \bar{I}(i,j) \quad (11).$$

A subtraction means 54 subtractively combines pixel by pixel the pixel intensity I(i,j) and the mean neighborhood value $\bar{I}(i,j)$. A multiplying means 56 multiplies the difference between the pixel and mean neighborhood values by the corresponding transfer function value G(i,j). An adding means 58 additively combines the mean neighborhood value and the transfer function product pixel by pixel. Each resultant enhanced/filtered pixel value I'(i,j) is stored at the corresponding pixel of a second or improved image memory 60. The improved image may be displayed on a video monitor 62 or other display means. Optionally, the image may be stored on magnetic tape or disk subject to further processing, or the like.

Figure 4:
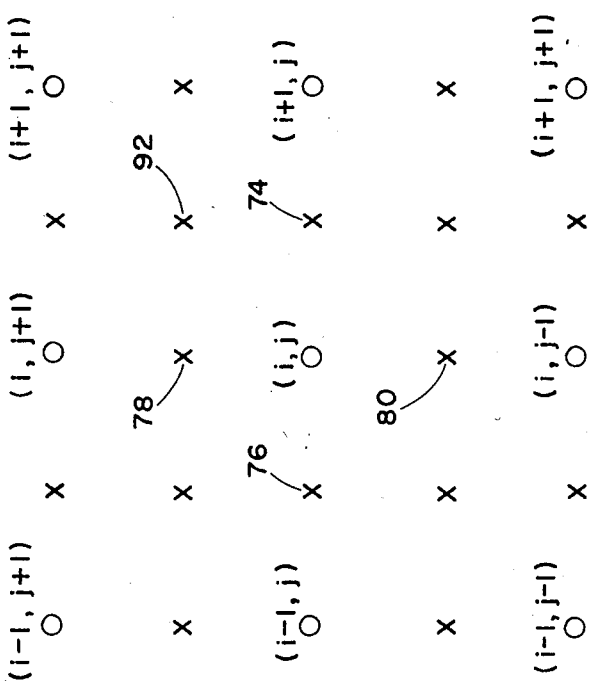

With continuing reference to FIG. 1 and further reference to FIG. 4, if a portion of the resultant image is to be enlarged for closer review, the zoom circuit D is activated. In the enlarged or zoomed image, there are more pixels than there are pixel values in the original image from the improved image memory 60. A subregion loading means 70 loads the pixel values from the region to be enlarged in the original image into corresponding pixels which are distributed uniformly over a zoom memory 72. If the region of the original image is to be doubled in width and height, then there are empty pixels, note pixels 74 and 76, between each filled pixel of each column. Analogously, between each row of filled pixels, the zoom memory 72 has an empty row of pixels, note rows 78 and 80. It is to be appreciated that if the region of interest is to be more enlarged, there will be more intervening unfilled pixels. If the region of interest is to be less enlarged, there will be fewer unfilled pixels. The zoom means D derives pixel values for each empty pixel in the zoom memory 72 from the pixel values loaded from the original image 60 by the loading means 70. More specifically, the zoom circuit D fills each empty pixel with a value that is equal to the sum of an average of neighboring pixel values and a fractal value F.

An averaging means 82 averages the pixel values of the filled pixels which neighbor or are contiguous to each empty pixel. For example, empty pixel 74 is filled with the average of the neighboring pixel values (i,j) and (i+1,j), i.e. $[I(i,j)+I(i+1,j)]/2$. Optionally, the average may be based on other average or mean value algorithms.

An image may be thought of as an intensity surface, where each pixel intensity value represents height (z-coordinate) above the corresponding pixel location on x-y plane.

The fractal value F is a function of the roughness or variation in neighboring values and random numbers. A roughness means 84 calculates a roughness factor R for each empty pixel based on the self-similarity factors of neighboring filled pixels. Preferably, the roughness factor is set equal to a power of the average self-similarity factor of the adjoining filled pixels. For pixel 74, the roughness factor is:

$$R = h \cdot 2^{-[H(i,j)+H(i+1,j)]/2} \quad (12),$$

where h is a constant selected in accordance with system parameters, the video monitor, and the desired characteristics of the zoomed image. Again, the exponent may be based on the nearest neighbors and more distant neighboring pixels. A multiplying means 86 multiplies the roughness factor R for each interpolated pixel by a random number generated by random number generator 88 to generate the fractal value F. An adding means 90 combines the fractal value and the average value to produce the interpolated pixel value, i.e.:

$$I(\text{inter}) = [I(i,j) + I(i+1,j)]/2 + R \cdot (\text{random } \#) \quad (13).$$

The interpolated value for pixel 78 may be calculated analogously based on filled pixel values $I(i,j)$ and $I(i,j+1)$. The interpolated value for a pixel 92 at the intersection of empty rows and columns may be determined from the intensities and self-similarity factors from the four nearest neighbor pixels $(i,j)$, $(i+1,j)$, $(i,j+1)$, and $(i+1, j+1)$. Alternately, the pixel value 92 may be interpolated analogously from the four nearest interpolated pixel values or from a combination of the four nearest interpolated pixel values and the four nearest filled pixel values.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. An apparatus for generating medical diagnostic image representations, the apparatus comprising:
   a medical diagnostic apparatus for generating diagnostic data indicative of a preselected image region of a patient;
   an imager for generating an electronic image representation from the diagnostic data, the electronic image representation including a pixel value corresponding to each pixel of a pixel array, each pixel value is indicative of an image property of a corresponding subregion of the image region of the patient;
   a self-similarity value generating means for generating a self-similarity value corresponding to each pixel, the self-similarity value generating means being operatively connected with the imager to receive pixel values therefrom, each self-similarity value varying in accordance with a ratio of (i) a difference between the corresponding pixel value and a first set of pixel values contiguous to and surrounding the corresponding pixel value and (ii) the corresponding pixel value and a second set of pixel values contiguous to and surrounding the first set of pixel values;
   an image improvement means for replacing each pixel value by a combination of the replaced pixel value and an average of surrounding pixel values, the combination being weighted in accordance with the corresponding self-similarity value, the image improvement means being operatively connected with the imager and the self-similarity value generating means.

2. An apparatus for generating medical diagnostic image representations, the apparatus comprising:
   a medical diagnostic apparatus for generating medical diagnostic signals indicative of an image region of a patient;
   an imager for transforming the medical diagnostic signals into electronic image representations, each electronic image representation including a pixel value corresponding to each pixel of a pixel array;
   a loading means for loading each pixel value into uniformly distributed, spaced pixels of a zoom memory means such that the pixel values are stored in uniformly distributed filled pixels and empty pixels are disposed therebetween;
   an interpolating means for generating a pixel value for each empty pixel, the interpolating means including:
      an averaging means for generating an average of neighboring pixel values;
      a random number generator for generating a random number;
      a self-similarity value generating means for generating a self-similarity value corresponding to each pixel, the self-similarity value generating means being operatively connected with the imager to receive pixel values therefrom, each self-similarity value varying in accordance with a ratio of differences between the corresponding pixel value and pixel values in at least two rings contiguous to the corresponding pixel value;
      a weighting means for weighting the random number in accordance with the self-similarity value, the weighting means being operatively connected with the self-similarity value generating means and the random number generator; and,
      combining means for combining the pixel value average from the averaging means and the weighted randon number from the weighting means, the combining means being operatively connected with the averaging means to receive the average value therefrom, with the weighting means for receiving the weighted random number therefrom, and with the zoom memory means for storing the combined average pixel value and weighted random number at the corresponding empty pixel thereof.

3. A method of medical diagnostic imaging comprising:
   converting medical diagnostic data into an electronic image representation which includes an array of pixel values;
   generating a self-similarity value corresponding to each pixel value of the electronic image representation, each self-similarity value being a dimensionless value which varies with a degree of irregularity among pixel values in a neighborhood of the corresponding pixel value;
   providing an improved electronic image representation by replacing each pixel value by a combination of the replaced pixel value and an average of surrounding pixel values, the combination being weighted in accordance with the corresponding self-similarity value.

4. The method as set forth in claim 3 wherein the self-similarity value generating step includes:
   determining a difference between the corresponding pixel value and each pixel value within a nearest neighbor first ring and averaging the first ring differences;

determining a difference between the corresponding pixel value and pixel values in a next nearest neighboring second ring and averaging the second ring differences.

5. The method as set forth in claim 4 wherein the self-similarity value generating step further includes determining a logarithm of a ratio of the first ring and second ring differences.

6. The method as set forth in claim 5 further including multiplying the logarithm by a constant selected in accordance with the diameter of the rings.

7. The method as set forth in claim 5 wherein the replacing step further includes determining a transfer function for each pixel value from the corresponding self-similarity value and wherein the combination is weighted by multiplying the combination by the transfer function.

8. The method as set forth in claim 7 wherein the transfer function is inversely proportional to the self-similarity value for at least a selected range of self-similarity values.

9. The method as set forth in claim 7 wherein the transfer function is set equal to a first constant when the self-similarity value exceeds a preselected value and the transfer function is set equal to a second preselected constant when the self-similarity value is equal to or less than the preselected value.

10. The method as set forth in claim 4 further including enlarging a selected portion of the electronic image representation, the enlarging step including distributing pixel values from the selected image representation portion substantially uniformly among available pixels of an enlarged image electronic representation such that a fraction of the enlarged image representation pixels are filled by the transferred pixel values and empty pixels are defined therebetween and interpolating neighboring filled pixel values to derive pixel values for the empty pixels.

11. The method as set forth in claim 10 wherein the interpolating step includes:
for each empty pixel, averaging pixel values from neighboring filled pixels; and,
adding to the averaged pixel valves a fractal value which varies in accordance with a random number and the self-similarity value.

12. The method as set forth in claim 11 wherein the fractal value varies in proportion to a constant raised to a power of an average of the self-similarity values corresponding to the neighboring filled pixels.

13. A method of improving an image comprising:
converting data into an electronic image representation which includes an array of pixel values;
determining a first difference between the corresponding pixel value and each pixel value within a first surrounding ring and averaging the first ring differences;
determining a difference between the corresponding pixel value and each pixel value in a second surrounding ring and averaging the second ring differences;
generating a self-similarity value corresponding to each pixel value of the electronic image representation in accordance with a difference between the first and second difference averages corresponding to the same pixel value;
providing an improved electronic image representation by replacing each pixel value by a combination of the replaced pixel value, pixel values of pixels surrounding the replaced pixel value, and the self-similarity value corresponding to the replaced pixel value.

14. A method of medical diagnostic imaging comprising:
converting medical diagnostic data into an electronic image representation which includes an array of pixels, each pixel having a pixel value;
generating a self-similarity value corresponding to each pixel;
enlarging a selected portion of the electronic image representation, the enlarging step including distributing pixel values of the selected image representation portion substantially uniformly among pixels of an enlarged image electronic representation such that a fraction of the enlarged image representation pixels are filled by the transferred pixel values and empty pixels are defined therebetween;
for each empty pixel, averaging pixel values from neighboring filled pixels;
for each empty pixel deriving a fractal value which varies in accordance with a random number and the self-similarity values of the neighboring filled pixels; and,
combining the fractal value and the neighboring pixel value average that corresponds to the same empty pixel.

15. The method as set forth in claim 14 wherein the fractal value varies in proportion to a constant raised to a power of an average of the self-similarity values corresponding to the neighboring filled pixels.

16. The method as set forth in claim 15 wherein each self-similarity value varies in accordance with a ratio of variations between the corresponding pixel value and pixel values in at least two surrounding rings.

17. The method as set forth in claim 15 wherein the self-similarity value generating step includes:
determining a difference between the corresponding pixel value and each pixel value within a first surrounding ring and averaging the first ring differences;
determining a difference between the corresponding pixel value and each pixel value in a second surrounding ring and averaging the second ring differences.

18. The method as set forth in claim 17 wherein the self-similarity value generating step further includes determining a logarithm corresponding to a ratio of the first ring and second ring differences.

19. The method of claim 18 including providing an improved electronic image representation by replacing each pixel value by a combination of the pixel value and an average of surrounding pixel values, each combination being weighted in accordance with the corresponding self-similarity value.

20. A method of enlarging a selected portion of an image representation comprising:
converting data into an electronic image representation which includes an array of pixels, each pixel having a pixel value;
generating a self-similarity value corresponding to each pixel from pixel values of adjacent pixels;
distributing pixel values of the selected image representation portion substantially uniformly among pixels of an enlarged image electronic representation such that a fraction of the enlarged image representation pixels are filled by the transferred pixel values and empty pixels are defined therebetween;

for each empty pixel, averaging pixel values from neighboring filled pixels;

for each empty pixel, deriving a fractal value which varies in accordance with a random number and the self-similarity values of adjacent pixels; and, combining the fractal value and the neighboring pixel value average that corresponds to the same empty pixel.

* * * * *